United States Patent
Yamada et al.

(10) Patent No.: US 7,650,082 B2
(45) Date of Patent: Jan. 19, 2010

(54) OPTICAL COMMUNICATION TRANSMITTER, OPTICAL COMMUNICATION RECEIVER, OPTICAL COMMUNICATION SYSTEM, AND COMMUNICATION APPARATUS

(75) Inventors: Masashi Yamada, Gunma (JP); Kousuke Nakamura, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 538 days.

(21) Appl. No.: 11/499,413

(22) Filed: Aug. 4, 2006

(65) Prior Publication Data
US 2007/0031157 A1 Feb. 8, 2007

(30) Foreign Application Priority Data
Aug. 5, 2005 (JP) .............................. 2005-227477

(51) Int. Cl.
*H04B 10/04* (2006.01)
(52) U.S. Cl. ......................... 398/198; 398/196
(58) Field of Classification Search .......... 398/193–199
See application file for complete search history.

(56) References Cited

U.S. PATENT DOCUMENTS

| | | | | |
|---|---|---|---|---|
| 4,945,541 A * | 7/1990 | Nakayama | .................... | 372/31 |
| 5,077,619 A * | 12/1991 | Toms | ........................ | 398/193 |
| 6,588,950 B1 * | 7/2003 | Pfeiffer | ..................... | 398/140 |
| 2001/0050795 A1 * | 12/2001 | Numata et al. | ............. | 359/188 |
| 2004/0109696 A1 * | 6/2004 | Toshihisa | .................... | 398/198 |

FOREIGN PATENT DOCUMENTS

| | | |
|---|---|---|
| JP | 10-051387 | 2/1998 |
| JP | 2002-290335 | 10/2002 |
| JP | 2003-318836 | 11/2003 |
| JP | 3465017 | 11/2003 |

OTHER PUBLICATIONS

T. Taguchi et al., "Future Prospect and Application of White LED Lighting System Technologies", CMC Publishing Co., Ltd., Jul. 2003.

* cited by examiner

*Primary Examiner*—Nathan M Curs
(74) *Attorney, Agent, or Firm*—Knobbe Martens Olson & Bear LLP

(57) ABSTRACT

In one inventive aspect, a transmitter is provided. In the transmitter, a modulator supplies an electrical current based on a digital transmission electrical signal to a white LED, which emits light including a plurality of wavelengths into the air. A light detector separates a light signal component having a blue wavelength from the emitted light using an optical filter and converts the signal component to a monitoring electrical signal. A waveform control circuit outputs a control signal so that the time delay of the waveform of the monitoring signal with respect to the waveform of the transmission electrical signal is less than or equal to a predetermined value. The modulator corrects the amount of the electrical current supplied to the white LED on the basis of the control signal. In another inventive aspect, a receiver is provided. In the receiver, an optical filter separates a light signal component having a blue wavelength and a light detector detects substantially only the light signal component having a blue wavelength.

13 Claims, 9 Drawing Sheets

OPTICAL COMMUNICATION TRANSMITTER, OPTICAL COMMUNICATION RECEIVER, OPTICAL COMMUNICATION SYSTEM, AND COMMUNICATION APPARATUS

BACKGROUND OF THE INVENTION

1. Field of the Invention

The present invention relates to an optical communication transmitter, an optical communication receiver, an optical communication system, and a communication apparatus for communicating a signal using a white-light-emitting diode.

2. Description of the Related Technology

In recent years, white-light-emitting diodes (white LEDs) have become increasingly popular. White LEDs are applicable to a variety of applications, such as lighting equipment, car lamps, and backlights of liquid crystal displays. Compared with other white light sources (such as fluorescent lamps), white LEDs have a very quick response when powering on and powering off. By using this feature, a system that uses the white LED lighting as a data transmission capability has been proposed (refer to, for example, Japanese Unexamined Patent Application Publication No. 2003-318836).

In the data transmission system using a white LED, white light emitted from the LED is used as a data transmission medium. The intensity of light emitted from the LED is modulated in accordance with the transmission data. At a receiving end, the light is received by means of a photoelectric converter (O/E converter), such as a photodiode (PD), and is detected to achieve the data transmission.

The types of white LED are classified into three groups by a light emission method (refer to, for example, Japanese Unexamined Patent Application Publication No. 2002-290335).

A first light emission method of the white LED is to combine a blue LED and a yellow fluorescent material. In this method, a fluorescent material such as YAG (yttrium aluminum garnet) is disposed around a blue LED, and the fluorescent material and the blue LED are packaged into one component. The light from the blue LED disposed at the center excites the fluorescent material so that the fluorescent material emits light that is complementary to blue light (mainly yellow light). By combining this fluorescent light and the original blue light from the blue LED, pseudo-white light is produced. Hereinafter, this type of white LED is referred to as a "blue-light-excited white LED". The advantages of the blue-light-excited white LED are as follows: (a) The energy use efficiency is high compared with other methods, and therefore, a high luminance can be easily obtained; and (b) The structure is simple, and therefore, the manufacturing cost is low. However, the blue-light-excited white LED has a disadvantage in that the blue-light-excited white LED has poor color rendering properties. As used herein, the term "color rendering properties" is referred to as the appearance of colors of an object when illuminated by light from a given source. As the color is closer to that under natural light, the color rendering properties become higher.

A second light emission method of the white LED is to combine a UV LED and a fluorescent material for emitting three primary light components RGB (red, green, and blue). The fluorescent material for emitting the three primary light components RGB is disposed around the UV LED, and the fluorescent material and the UV LED are packaged into one component. The light from the UV LED disposed at the center excites the fluorescent material so that the fluorescent material emits the three primary light components RGB. Thus, white light is produced. Hereinafter, this type of white LED is referred to as a "UV-excited white LED". The UV-excited white LED has an advantage in that the UV-excited white LED has good color rendering properties. However, the UV-excited white LED has a disadvantage in that (a) The energy use efficiency is low compared with the blue-light-excited white LED, and therefore, it is difficult to produce high luminance; and (b) A high driving voltage is required to emit UV light.

A third light emission method of the white LED is to combine a red LED, a green LED, and a blue LED into one package. By emitting three primary color light from the corresponding LEDs at the same time, white light is produced. Hereinafter, this type of white LED is referred to as a "three-color-emitting white LED".

The three-color-emitting white LED has an advantage in that, like the UV-excited white LED, the three-color-emitting white LED has good color rendering properties. However, the three-color-emitting white LED has a disadvantage in that the three-color-emitting white LED is expensive compared with the other methods since three types of LED are integrated into one package.

The features of data transmission are described next when each type of white LED is used for data transmission.

When data transmission is performed using the blue-light-excited white LED, which is currently widely available in the marketplace, the transmission speed of the blue-light-excited white LED is limited to several Mbps since the response time of the light emitted from the fluorescent material is slow. To solve this problem, Japanese Unexamined Patent Application Publication No. 2003-318836, for example, describes a technique for decreasing response time in which a color filter that transmits substantially only blue light is disposed at the front of an O/E converter so as to remove a light component that is emitted from the fluorescent material and that has a slow response time. However, even when this technique is applied, the response speed is only increased up to several tens of Mbps.

When data transmission is performed using the UV-excited white LED, the transmission speed is limited to several Mbps due to the same reason as that for the blue-light-excited white LED. In addition, the driving voltage of the LED is high, and therefore, it is difficult to design a driving circuit.

When data transmission is performed using the three-color-emitting white LED, high-speed data transmission can be provided since the three-color-emitting white LED has no fluorescent light components and different signals can be transmitted from the different LEDs (multiple-wavelength transmission) (refer to, for example, T. Taguchi, et. al, "Future Prospect and Application of White LED Lighting System Technologies," CMC Publishing CO., LTD, July, 2003). However, since each of the LEDs is expensive, the system cost is disadvantageously increased.

As described above, when performing data transmission using the white LED, the transmission speed can be increased by using the three-color-emitting white LED. However, since the three-color-emitting white LED is expensive, the use of the three-color-emitting white LED is not always appropriate in terms of the versatility.

In addition, when performing data transmission using the blue-light-excited white LED, the limit of the transmission speed can be increased only up to several tens of Mbps even when a color filter that blocks light emitted from the fluorescent material having a slow response time is used as described in Japanese Unexamined Patent Application Publication No. 2003-318836.

FIG. 8 illustrates the configuration of a data transmission system including a transmitter 10 and a receiver 20 using the blue-light-excited white LED according to a known technology. In this system, a modulator 11 modulates light output from a white LED 12 using a modulation method, such as on-off keying (OOK). Thus, the white light emitted from the white LED 12 blinks. The blinking state is detected by a light detector 21 of the receiver 20 disposed far from the transmitter 10 and is demodulated by a demodulator 22. Thus, a signal can be transmitted from the transmitter 10 to the receiver 20. However, in such a configuration, if the signal input to the white LED 12 is turned on and off at high speed, the distortion of the waveform occurs due to the delay of the response time of light output from the fluorescent material, as shown in FIG. 9. Accordingly, intersymbol interference occurs, which impairs high-speed transmission using the blue-light-excited white LED.

FIG. 10 illustrates another configuration of a data transmission system including a transmitter 10 and a receiver 20 using the blue-light-excited white LED. In this system, an optical filter 23 that transmits substantially only the wavelength of light from the blue LED (hereinafter referred to as a "blue filter") is provided to the receiver 20. The blue filter 23 eliminates light emitted from a fluorescent material having a slow response time from the light signal. Therefore, substantially only the light emitted from the blue LED enters the light detector 21. As a result, data transmission faster than that in the configuration shown in FIG. 8 can be achieved. However, the cutoff frequency of existing LEDs is several tens of MHz at the highest. If the signal is OOK-modulated for a transmission speed corresponding to a frequency higher than the cutoff frequency, distortion as shown in FIG. 9 is generated in the output light signal, and therefore, intersymbol interference occurs. Accordingly, the highest transmission speed is also limited.

In addition, in data transmission using the UV-excited white LED, like data transmission using the blue-light exited white LED, the slow data transmission speed due to the slow response time of light emitted from a fluorescent material cannot be avoided. Furthermore, since the high driving voltage is required, it is disadvantageously difficult to design a driving circuit for the UV-excited white LED.

Still furthermore, although a method for decreasing a response time of light emitted from a fluorescent material by improving the characteristics of the fluorescent material has been proposed, it is difficult to obtain a desired luminance. Also, the cost of the fluorescent material increases.

Accordingly, from a viewpoint of a system configuration, it is desirable that high-speed signal transmission is achieved using the blue-light-excited white LED that is versatile and inexpensive.

SUMMARY OF CERTAIN INVENTIVE ASPECTS

Accordingly, it is an object of certain inventive aspects to provide an optical communication transmitter, an optical communication receiver, an optical communication system, and a communication apparatus for communicating a signal using light including multiple wavelength at high speed.

According to one inventive aspect, an optical communication transmitter includes light emitting device for, upon receiving an electrical current based on a digital transmission electrical signal, emitting light and outputting a light signal including a plurality of wavelengths, modulating circuit for receiving the transmission electrical signal and delivering the electrical current in accordance with the transmission electrical signal to the light emitting device, where the modulating circuit performs peaking the electrical current and inputting the electrical current to the light emitting device, detecting circuit for selectively detecting a light signal component having a specific wavelength from the light signal output from the light emitting device, converting the light signal component to a monitoring electrical signal, and outputting the monitoring electrical signal, and waveform controlling circuit for correcting the amount of peaking performed by the modulating circuit on the basis of the response time of the monitoring electrical signal detected by the detecting circuit with respect to the transmission electrical signal.

In an optical communication transmitter according to one inventive aspect, an electrical current based on a digital transmission electrical signal is supplied to the light emitting device. The light emitting device emits light and outputs a light signal including a plurality of wavelengths. Additionally, the detecting circuit selectively detects substantially only a light signal component having a specific wavelength from the light signal output from the light emitting device, converts the light signal component to a monitoring electrical signal, and outputs the monitoring electrical signal. Furthermore, the waveform controlling circuit and the modulating circuit correct the amount of peaking performed by the modulating circuit on the basis of the response time of the monitoring electrical signal detected by the detecting circuit with respect to the transmission electrical signal. For example, the electrical current supplied to the light emitting device is corrected so that the time delay of the waveform of the monitoring electrical signal with respect to the waveform of the transmission electrical signal is less than or equal to a predetermined value. Accordingly, by receiving substantially only a light signal component having a specific wavelength in the light signal output from the light emitting device, the distortion of the waveform of the light signal can be minimized, and therefore, high-speed transmission can be achieved.

According to another inventive aspect, an optical communication receiver receives a light signal transmitted from an optical communication transmitter including outputting circuit. The outputting circuit outputs a light signal including a plurality of wavelengths on the basis of a digital transmission electrical signal. The outputting circuit decreases the response time of the light signal component having a specific wavelength in the light signal and outputs the light signal. The optical communication receiver includes detecting circuit for selectively detecting the light signal component having the specific wavelength from the light signal transmitted from the optical communication transmitter and outputting the detected light signal component in the form of an electrical signal.

In an optical communication receiver according to one inventive aspect, the detecting circuit selectively detects substantially only the light signal component having the specific wavelength from the light signal transmitted from the optical communication transmitter and outputting the detected light signal component in the form of an electrical signal. Accordingly, by receiving substantially only a light signal component having a specific wavelength in the light signal output from the optical communication transmitter, the distortion of the waveform of the light signal can be minimized, and therefore, high-speed transmission can be achieved.

According to still another inventive aspect, an optical communication system includes the above-described optical communication transmitter and the above-described optical communication receiver.

According to one optical communication system, since the optical communication receiver receives substantially only a light signal component having a specific wavelength in the light signal output from the optical communication transmitter, the distortion of the waveform of the light signal can be minimized, and therefore, high-speed transmission can be achieved.

According to still another inventive aspect, a communication apparatus includes an optical communication transmitter and an optical communication receiver. The optical communication transmitter includes light emitting device for, upon receiving an electrical current based on a digital transmission electrical signal, emitting light and outputting a first light signal including a plurality of wavelengths, modulating circuit for receiving the transmission electrical signal and delivering the electrical current in accordance with the transmission electrical signal to the light emitting device, where the modulating circuit performs peaking the electrical current and inputting the electrical current to the light emitting device, first detecting circuit for selectively detecting a light signal component having a specific wavelength from the light signal output from the light emitting device, converting the light signal component to a monitoring electrical signal, and outputting the monitoring electrical signal, and waveform controlling circuit for correcting the amount of peaking performed by the modulating circuit on the basis of the response time of the monitoring electrical signal detected by the first detecting circuit with respect to the transmission electrical signal. The optical communication receiver includes second detecting circuit for selectively detecting the light signal component having the specific wavelength contained in an externally received second light signal and converting circuit for converting the detected light signal component to a digital received electrical signal.

According to one inventive aspect, since the optical communication receiver receives substantially only a light signal component having a specific wavelength in the light signal output from the optical communication transmitter, the distortion of the waveform of the light signal can be minimized, and therefore, high-speed transmission can be achieved.

As described above, according to one inventive aspect, a light signal component having a specific wavelength in the light signal output from the light emitting device is converted to a monitoring electrical signal. The amount of peaking is corrected on the basis of the response time of the monitoring electrical signal with respect to the transmission electrical signal. Thus, the distortion of the light signal component having the specific wavelength can be minimized. In addition, high-speed transmission of a signal can be achieved by using the light signal component having the specific wavelength.

According to one inventive aspect, by receiving substantially only a light signal component that has a specific wavelength in the light signal output from the optical communication transmitter and that has a fast response time, the distortion of the waveform of the light signal can be minimized, and therefore, high-speed transmission can be achieved.

As described above, according to one inventive aspect, since the optical communication receiver receives substantially only a light signal component having a specific wavelength from the light signal output from the optical communication transmitter, the distortion of the waveform of the light signal can be minimized, and therefore, high-speed transmission can be achieved.

As described above, according to one inventive aspect, a light signal including a plurality of wavelengths is transmitted and received. Since the communication apparatus uses substantially only a light signal component having a specific wavelength in the light signal and corrects the amount of peaking on the basis of the response time of the monitoring electrical signal detected by the detecting circuit with respect to the transmission electrical signal, the distortion of the waveform of the light signal can be minimized, and therefore, high-speed transmission can be achieved.

According to certain inventive aspects, low-cost and high-speed data transmission is achieved using a white LED compared with a known method.

In one inventive aspect, an optical communication transmitter comprises a modulating circuit configured to generate an electrical current based at least in part on a transmission electrical signal; an emitting device configured to receive the electrical current from the modulating circuit and emit a light signal comprising light components of a plurality of wavelengths based on the electrical current; a detecting circuit configured to selectively detect a light signal component having a specific wavelength from the light signal and convert the light signal component to a monitoring electrical signal; and a waveform controlling circuit configured to generate a control signal based at least in part on the response times of the monitoring electrical signal and the transmission electrical signal, the control signal being applied to adjust the operation of the modulating circuit.

According to one inventive aspect, a communication system comprises an optical communication transmitter and an optical communication receiver. The optical communication transmitter comprises a light emitting device configured to, upon receiving an electrical current based on a transmission electrical signal, emit a first light signal comprising components of a plurality of wavelengths; a modulating circuit configured to receive the transmission electrical signal and deliver the electrical current in accordance with the transmission electrical signal to the light emitting device, the modulating circuit peaking the electrical current; a first detecting device configured to selectively detect a light signal component having a specific wavelength from the light signal and convert the light signal component to a monitoring electrical signal; and a waveform controlling circuit configured to correct the amount of peaking performed by the modulating circuit on the basis of the response times of the monitoring electrical signal and the transmission electrical signal. The optical communication receiver comprises a second detecting device configured to selectively detect the light signal component having the specific wavelength from an externally received second light signal and a converting device configured to convert the detected light signal component to a reception electrical signal.

In another embodiment, a method of optical data transmission comprises driving a light source emitting a plurality of output wavelengths, detecting, at the transmitter, at least one selected wavelength component of the output, and modifying the driving waveform based at least in part on the detecting.

DESCRIPTION OF THE PREFERRED EMBODIMENTS

An optical communication system according to an embodiment is described in detail with reference to the accompanying drawings.

According to the present embodiment, an optical communication system includes an optical communication transmitter and an optical communication receiver. In order to minimize distortion of a signal and achieve high-speed transmission, the optical communication transmitter includes light emitting device for, upon receiving an electrical current based on a digital transmission electrical signal, emitting light and outputting a light signal including a plurality of wavelengths, modulating circuit for receiving the transmission electrical signal and delivering the electrical current in accordance with the transmission electrical signal to the light emitting device, where the modulating circuit performs peaking the electrical current and inputting the electrical current to the light emitting device, detecting circuit for selectively detecting a light signal component having a specific wavelength from the light signal output from the light emitting device, converting the light signal component to a monitoring electrical signal, and outputting the monitoring electrical signal, and waveform controlling circuit for correcting the amount of peaking performed by the modulating circuit on the basis of the response time of the monitoring electrical signal detected by the detecting circuit with respect to the transmission electrical signal.

Figure 1:
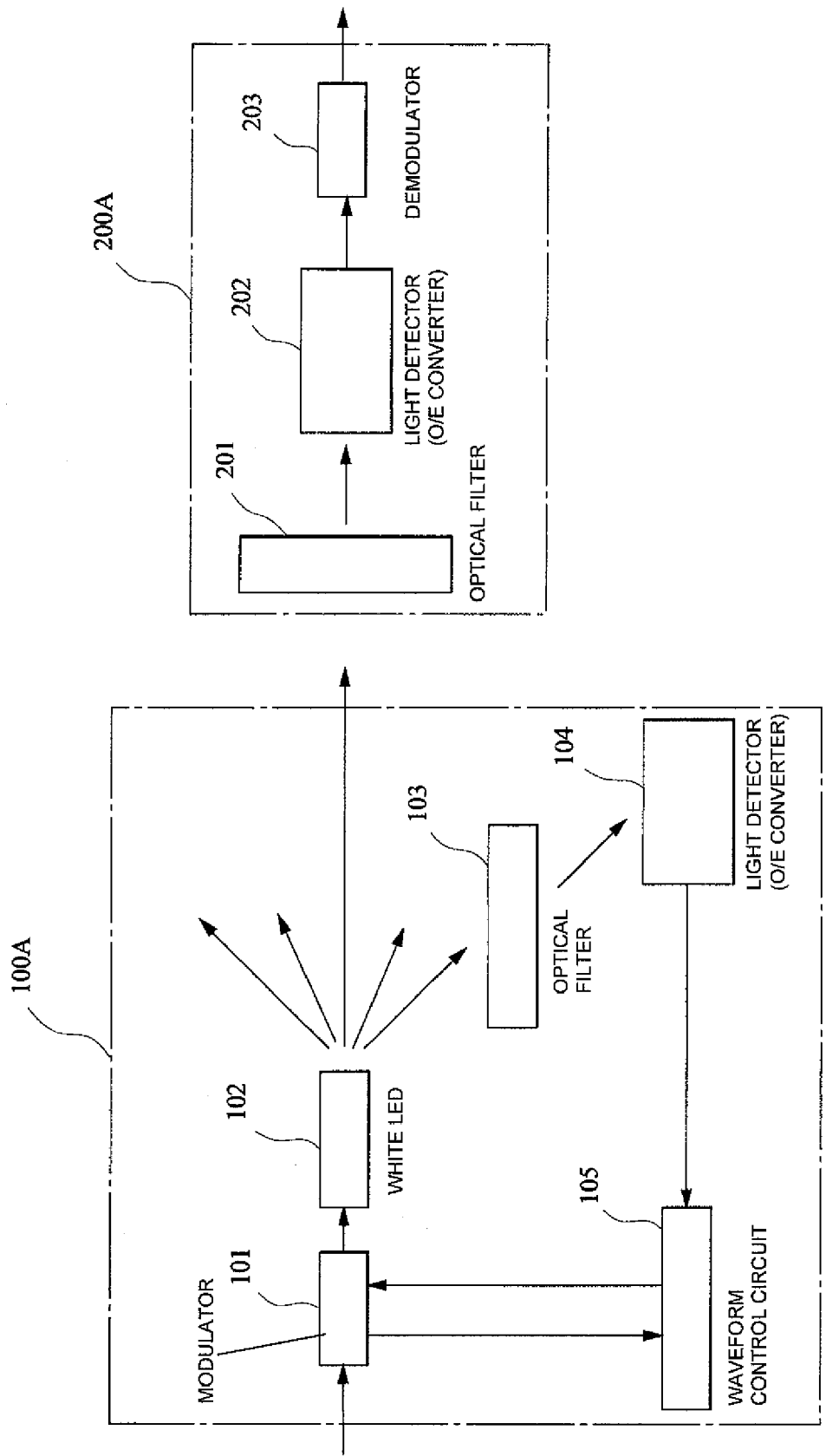
FIG. 1 is a block diagram illustrating the structure of an optical communication system according to a first exemplary embodiment.

The optical communication system is described in more detail next. FIG. 1 is a block diagram illustrating the configuration of an optical communication system according to a first exemplary embodiment. As shown in FIG. 1, the optical communication system includes an optical communication transmitter (hereinafter simply referred to as a "transmitter") 100A and an optical communication receiver (hereinafter simply referred to as a "receiver") 200A.

The transmitter 100A includes a modulator 101, a white LED 102, an optical filter 103, a light detector (photoelectric (O/E) converter) 104, and a waveform control circuit 105.

The modulator 101 externally receives a digital transmission electrical signal and delivers, to the white LED 102, a driving electrical current that varies in accordance with the transmission electrical signal.

Figure 2:
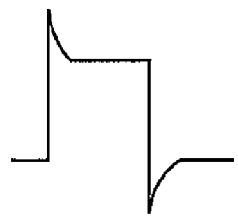
FIG. 2 is a waveform diagram illustrating a peaking technology.

Additionally, the modulator 101 has a function of speeding up the response of the light emission of the white LED 102 with respect to the waveform of the transmission signal. For example, Japanese Unexamined Patent Application Publication No. 62-118585 describes a technology known as "peaking" to speed up the response of the light emission of an LED. According to this technology, as shown in FIG. 2, by driving an LED using an electrical current of a digital signal with a waveform having enhanced rising and falling edges, high-speed modulation is achieved. However, if this technology is directly applied to the method for driving the white LED, the light signal to be monitored contains components of light emitted from a fluorescent material, namely, a plurality of wavelength components. Therefore, the driving waveform corrected on the basis of the monitoring result is not optimal for high-speed driving. In the first embodiment, in order to minimize the distortion of the waveform of the light signal and allow for high-speed communication, the modulator 101 includes waveform control circuit for monitoring a light signal of a specific wavelength and reducing the time delay of the waveform of the monitoring electrical signal with respect to the waveform of the transmission signal so that the time delay is less than or equal to a predetermined value.

Figure 3:
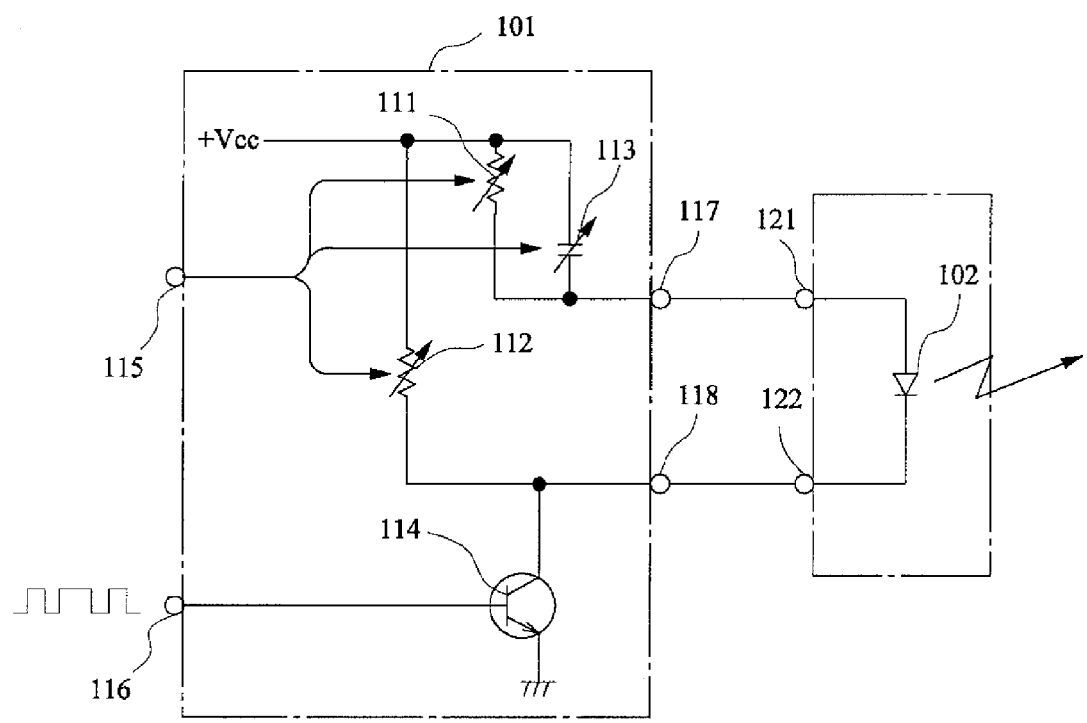
FIG. 3 is a circuit diagram of an example of a modulator according to the first exemplary embodiment.

FIG. 3 is a circuit diagram of an exemplary modulator 101 having the above-described peaking function according to the first embodiment. While the first embodiment is described with reference to the circuit configuration of the modulator 101 shown in FIG. 3, it is to be understood that the embodiments are not limited to such a circuit configuration. As shown in FIG. 3, the modulator 101 according to this embodiment includes resistor circuits 111 and 112 that can change the resistance values in response to a control signal and a capacitor circuit 113 that can change the capacitance value in response to a control signal, and an NPN transistor 114. The resistance values of the resistor circuits 111 and 112 may be changed electrically or mechanically. Also, the capacitance value of the capacitor circuit 113 may be changed electrically or mechanically.

A positive driving voltage +Vcc (e.g., +5 V) is applied to one end of the resistor circuit 111 and one end of the resistor circuit 112. Additionally, the capacitor circuit 113 is connected to the resistor circuit 111 in parallel. The other end of the resistor circuit 111 is connected to an anode terminal 121 of the white LED 102 via an output terminal 117, which is one of two output terminals.

The other end of the resistor circuit 112 is connected to a collector of the transistor 114 and is also connected to a cathode terminal 122 of the white LED 102 via an output terminal 118, which is the other of the two output terminals.

An emitter of the transistor 114 is connected to ground. A digitized transmission electrical signal is input to a base of the transistor 114 via an input terminal 116. Thus, the transistor 114 turns on when the transmission electrical signal is at a high level and turns off when the transmission electrical signal is at a low level. Accordingly, only when the transmission electrical signal is at a high level, the white LED 102 is energized so that the white LED 102 emits light.

When the transmission electrical signal rises from the low level to the high level, the capacitor circuit 113 is discharged. Accordingly, the driving electrical current having the enhanced rising edge (see FIG. 2) flows in the white LED 102, thus reducing the time delay of the light emission. Additionally, when the transmission electrical signal falls from the high level to the low level, the resistor circuit 112 rapidly causes the cathode potential to be equal to the anode potential, thus reducing the time delay of light emission stoppage. Furthermore, when the white LED 102 does not emit light, a capacitor in the capacitor circuit 113 is charged via the resistor circuit 111.

Figure 4:
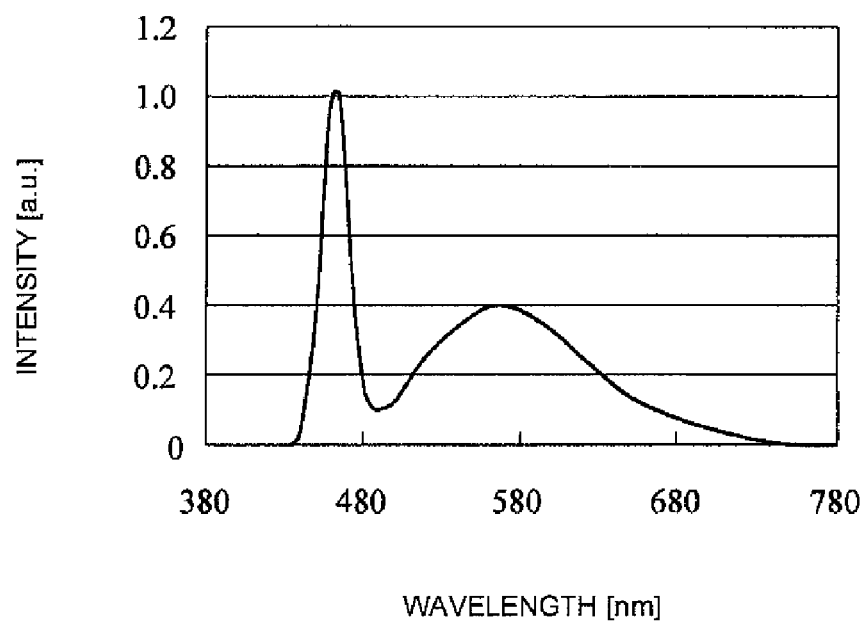
FIG. 4 illustrates the wavelength spectrum of light output from a known blue-light-excited white LED.

The white LED 102 includes the blue-light-excited white LED. As noted above, the white LED 102 emits light including a plurality of wavelengths in response to a driving electrical current supplied from the modulator 101. This light is irradiated in air (space). The space into which the light emitted from the white LED 102 is irradiated may contain sunlight and light emitted from a fluorescent lamp. FIG. 4 illustrates the wavelength spectrum of light output from a known bluelight-excited white LED. In the blue-light-excited white LED, a fluorescent material excited by light emitted from a blue LED emits yellow light that is complementary to blue light. The yellow light emitted from the fluorescent material is mixed with the blue light emitted from the blue LED so that white light is produced. In the system according to the present embodiment, this white light is used.

The light irradiated by the white LED 102 is partially incident on an optical filter 103. The optical filter 103 selectively transmits substantially only the light emitted from the blue LED and contained in the light irradiated by the white LED 102.

The blue light signal that has passed through the optical filter 103 is incident on the light detector 104, which converts the light signal into a monitoring electrical signal. The light detector 104 then outputs the monitoring electrical signal.

The waveform control circuit 105 includes a pre-defined arithmetic circuit or a central processing unit (CPU) which executes a predetermined program. The waveform control circuit 105 receives the transmission electrical signal from the modulator 101 and the monitoring electrical signal from the light detector 104. Subsequently, the waveform control circuit 105 compares the waveform of the transmission electrical signal with the waveform of the monitoring electrical signal. The waveform control circuit 105 generates a control signal for changing the resistance values of the resistor circuit 112 and the capacitance value of the capacitor circuit 113 so that the time delay of the waveform of the monitoring electrical signal with respect to the waveform of the transmission electrical signal is minimized or decreased below a predetermined value.

The receiver 200A includes an optical filter 201, a light detector (photoelectric converter (O/E converter)) 202, and a demodulator 203. The optical filter 201 selectively transmits the light emitted from the blue LED in the white LED (the blue-light-excited white LED). The light detector 202 detects light passing through the optical filter 201. The demodulator 203 demodulates an electrical signal output from the light detector 202 so as to output a digital signal.

According to an optical communication system having such a configuration, the transmitter 100A monitors substantially only a light signal component that is emitted from the blue LED and that has passed through the optical filter 103. Thereafter, the optical communication transmitter 100A corrects the driving waveform on the basis of the monitoring result. Accordingly, high-speed modulation can be achieved.

Furthermore, in the configuration according to the first embodiment, since the receiver 200A includes the optical filter 201 that is similar to that in the transmitter 100A, the receiver 200A can detect substantially only a light signal component that is emitted from the blue LED and that is speeded up. Accordingly, a high-speed transmission can be achieved.

Consequently, according to the first embodiment, the transmitter 100A detects a light signal emitted from the blue LED. The transmitter 100A then generates and corrects the waveform of a driving electrical current that is optimal for high-speed modulation on the basis of the detection result. Therefore, the transmitter 100A can output a light signal that is optimal for high-speed transmission even in a space where sunlight and light emitted from a fluorescent lamp. Thus, a high-speed transmission system can be achieved compared with that according to the known technology.

According to the first embodiment, in order to correct the driving waveform of the white LED 102 in the transmitter 100A, an adaptive driving wavelength correction function may be included in the transmitter 100A. Additionally, when this system includes more than or equal to two optical communication apparatuses, each including the transmitter 100A and the receiver 200A, and performs bi-directional transmission, the transmitter 100A of one of the communication apparatuses may transmit a training signal including information about a response time (i.e., time from the start of rise (or fall) to the end of rise (or fall) of the waveform) to the receiver 200A of the other of the communication apparatuses. The transmitter 100A of the other communication apparatus may correct the waveform of the driving electrical current of the white LED on the basis of the received information.

A second exemplary embodiment is described next.

Figure 5:
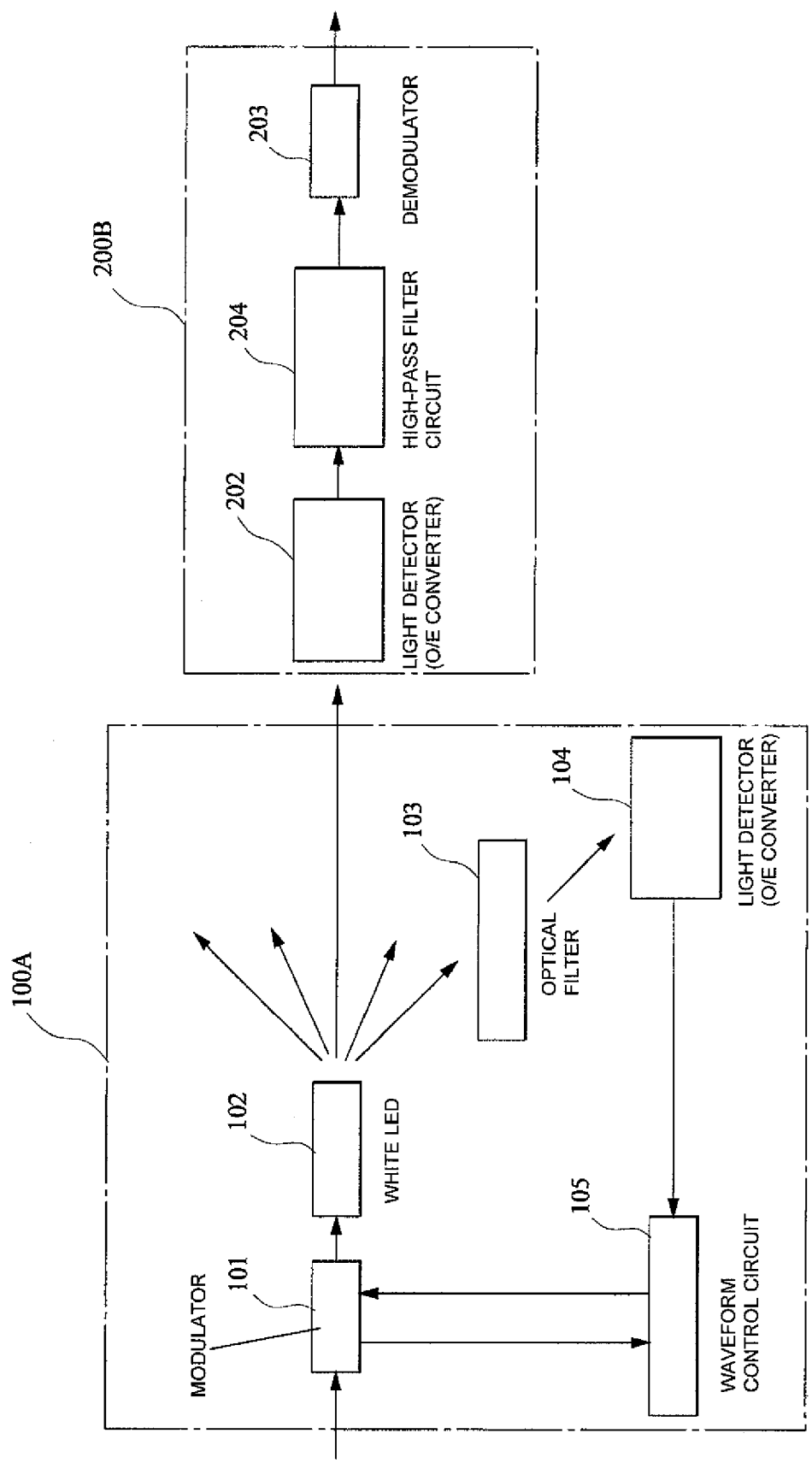
FIG. 5 is a block diagram illustrating the structure of an optical communication system according to a second exemplary embodiment.

FIG. 5 is a block diagram illustrating the configuration of an optical communication system according to the second embodiment. Like the optical communication system according to the first exemplary embodiment, the optical communication system according to the second embodiment may use a white LED.

The same reference numerals are used in both first embodiment and second embodiment shown in FIG. 5 to identify the same components, and therefore, a description thereof is not repeated. Although a transmitter 100A according to the second embodiment has a similar structure to that of the transmitter 100A according to the first embodiment, a receiver 200B includes a high-pass filter circuit 204 instead of the optical filter 201. The high-pass filter circuit 204 is disposed between the light detector 202 and the demodulator 203 and is connected to the light detector 202 and the demodulator 203.

According to the second embodiment, as described in the first embodiment, a light signal component emitted from a blue LED is sped up in the transmitter 100A. Accordingly, compared with normal square wave driving, the difference in response time between a light signal component from the fluorescent material and the light signal component from the blue LED is increased. Thus, in the receiver 200B, when a photoelectrically converted light signal passes through the high-pass filter circuit 204, the light signal component from the fluorescent material that has a slow response time can be eliminated. As a result, high-speed data transmission can be achieved.

Therefore, according to the second embodiment, the operation that is the same as that of the first embodiment is carried out. In addition, since the receiver includes an electrical filter circuit, a data transmission system having a simple configuration can be achieved.

According to the second embodiment, like the first embodiment, an adaptive driving wavelength correction function may be included in the transmitter 100A. Additionally, when this system includes more than or equal to two optical communication apparatuses, each including the transmitter 100A and the receiver 200B, and performs bi-directional transmission, the transmitter 100A of one of the communication apparatuses may transmit a training signal including information about the response time to the optical communication receiver 200B of the other of the communication apparatuses. The optical communication transmitter 100A of the other communication apparatus may correct the waveform of the driving electrical current of the white LED on the basis of the received information.

A third exemplary embodiment is described next.

Figure 6:
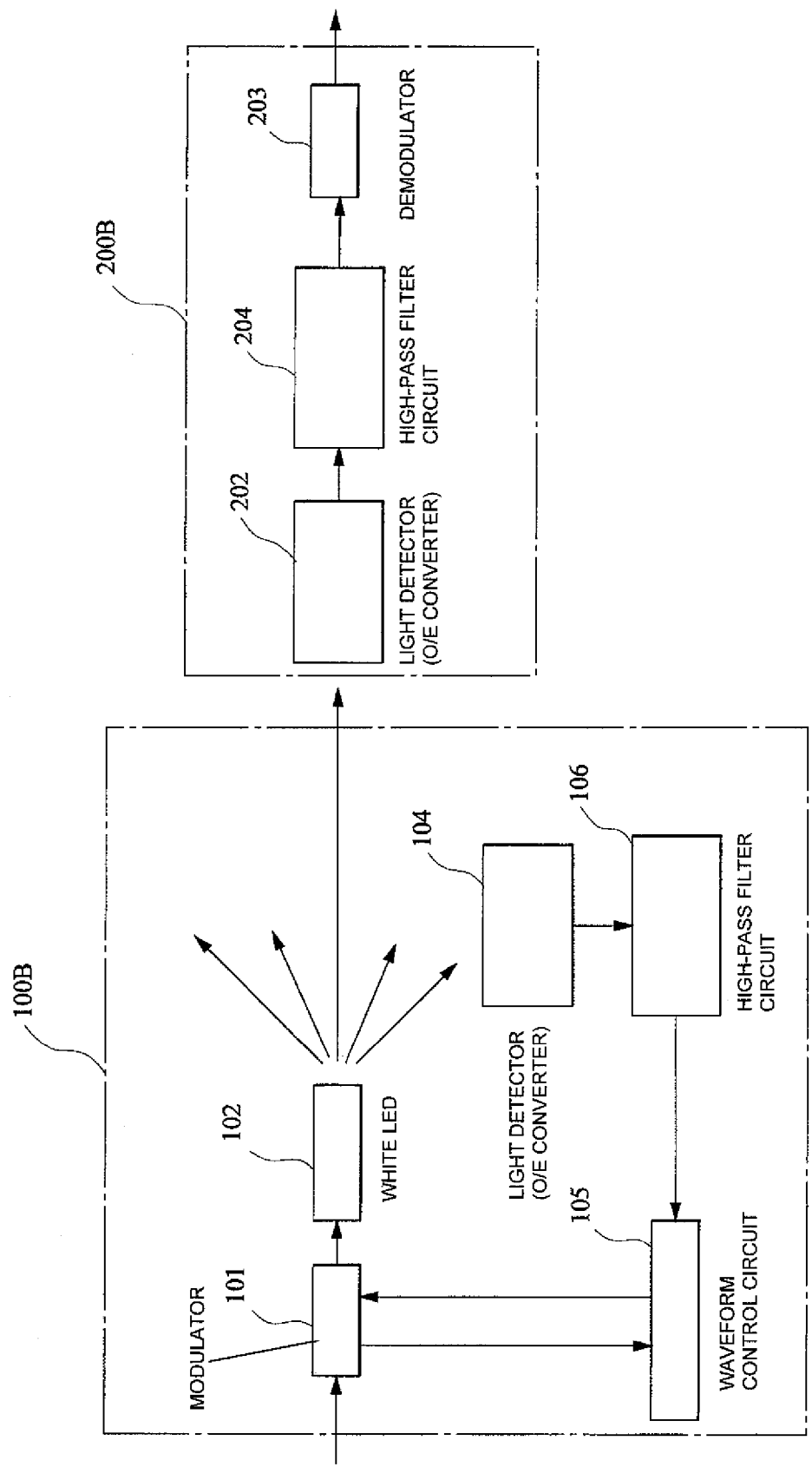
FIG. 6 is a block diagram illustrating the structure of an optical communication system according to a third exemplary embodiment.

FIG. 6 is a block diagram illustrating the configuration of an optical communication system according to the third embodiment. Like the optical communication systems according to the first and second exemplary embodiments, the optical communication system according to the third embodiment may use a white LED.

The same reference numerals are used in both third embodiment and first (or second) embodiment to identify the same components, and therefore, descriptions thereof are not repeated. Although a receiver 200B according to the third embodiment has a structure similar to that of the receiver 200B according to the second embodiment, a transmitter 100B includes a high-pass filter circuit 106 instead of the optical filter 103 used in the first embodiment. The high-pass filter circuit 106 is disposed between the light detector 104 and the waveform control circuit 105 and is connected to the light detector 104 and the waveform control circuit 105.

According to the third embodiment, the high-pass filter circuit 106 is provided instead of the optical filter 103 in the transmitter 100A according to the second embodiment. Accordingly, if the response time of a light signal component emitted from the fluorescent material is sufficiently slower than that of a light signal component emitted from the blue LED, the high-pass filter circuit 106 can detects substantially only the light signal component emitted from the blue LED. As a result, like the first and second embodiments, high-speed data transmission can be achieved.

Although the first to third embodiments have been described and illustrated, these embodiments are not to be limited to the configuration so described and illustrated. For example, to realize a communication apparatus, any combination of one of the transmitters 100A and 100B and one of the receivers 200A and 200B may be effective.

Figure 7:
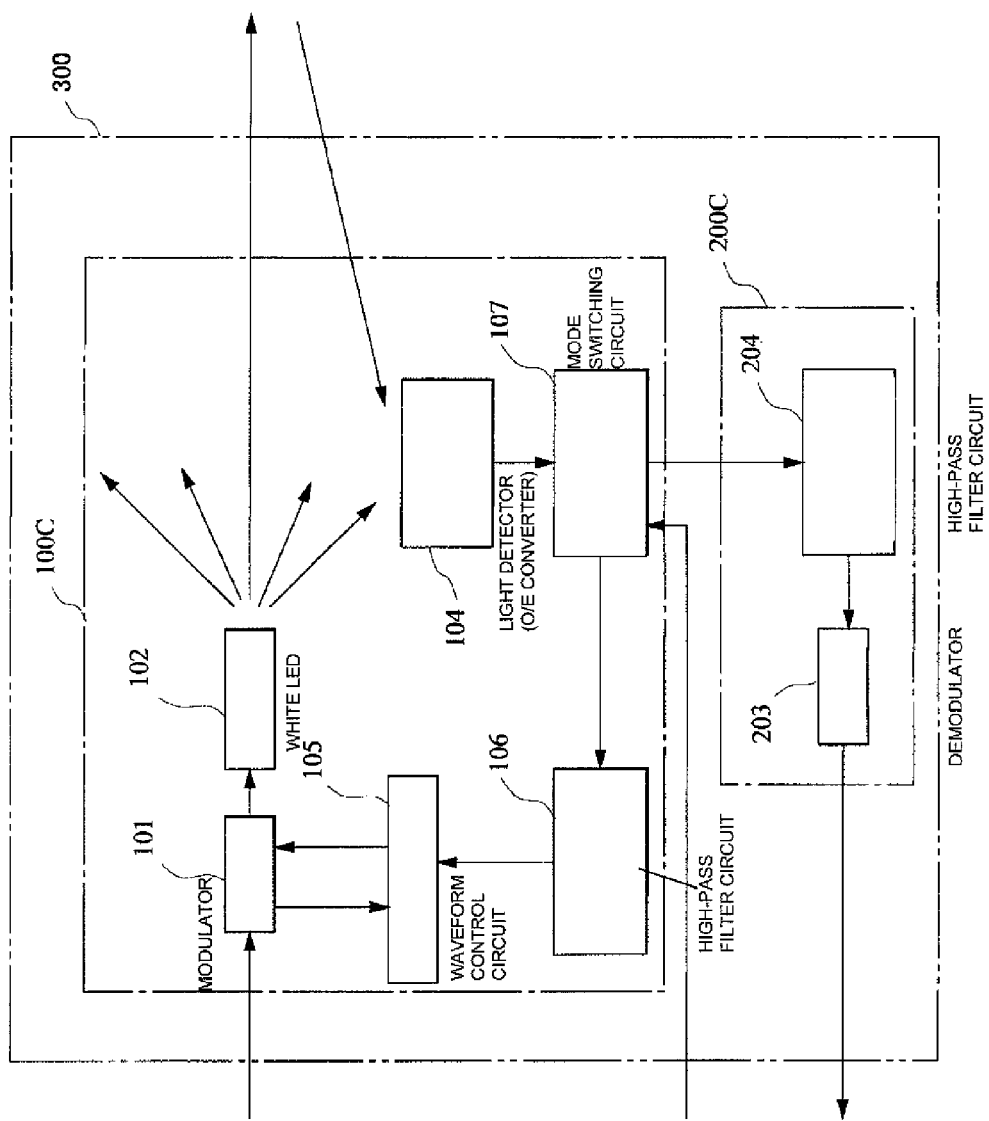
FIG. 7 is a block diagram illustrating the structure of a communication apparatus system according to a fourth exemplary embodiment.
Figure 8:
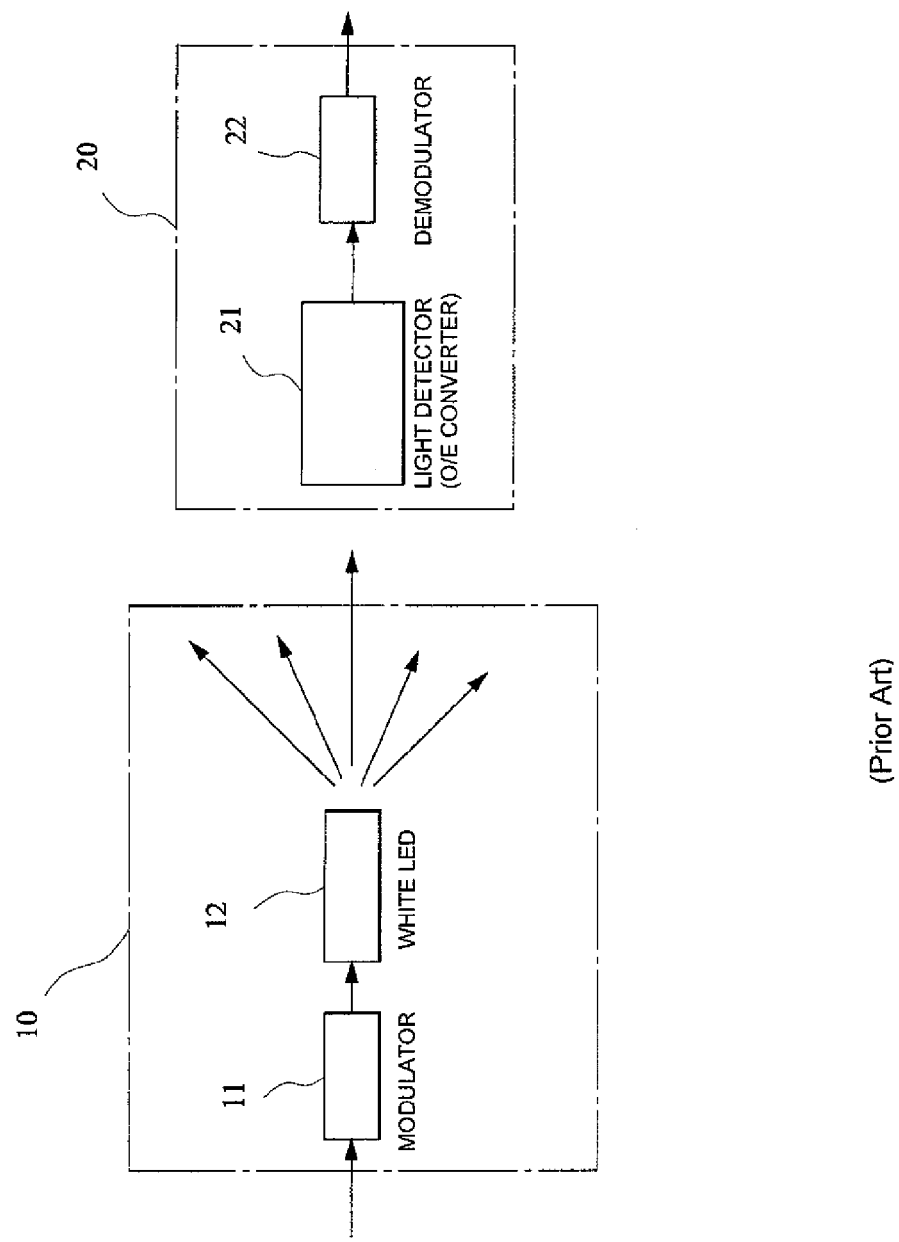
FIG. 8 illustrates the structure of a known optical communication system.
Figure 9:
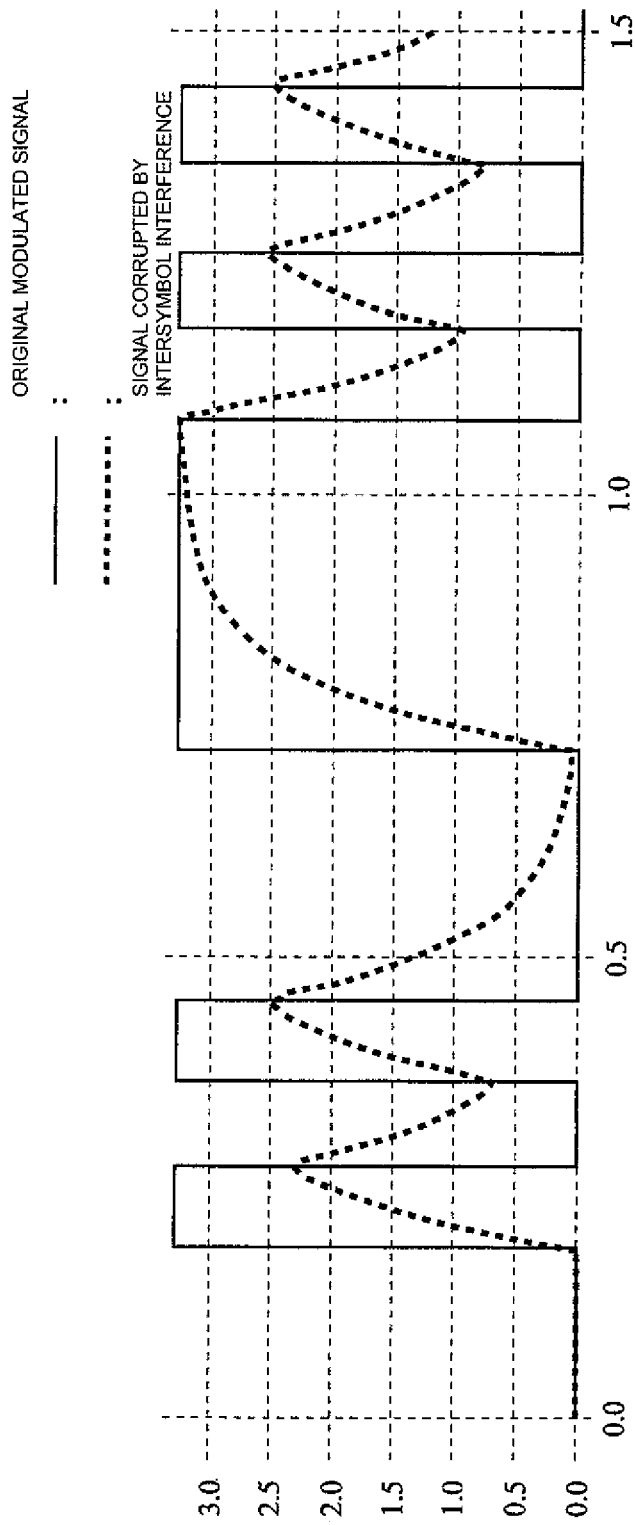
FIG. 9 illustrates the distortion of a waveform in a known example.
Figure 10:
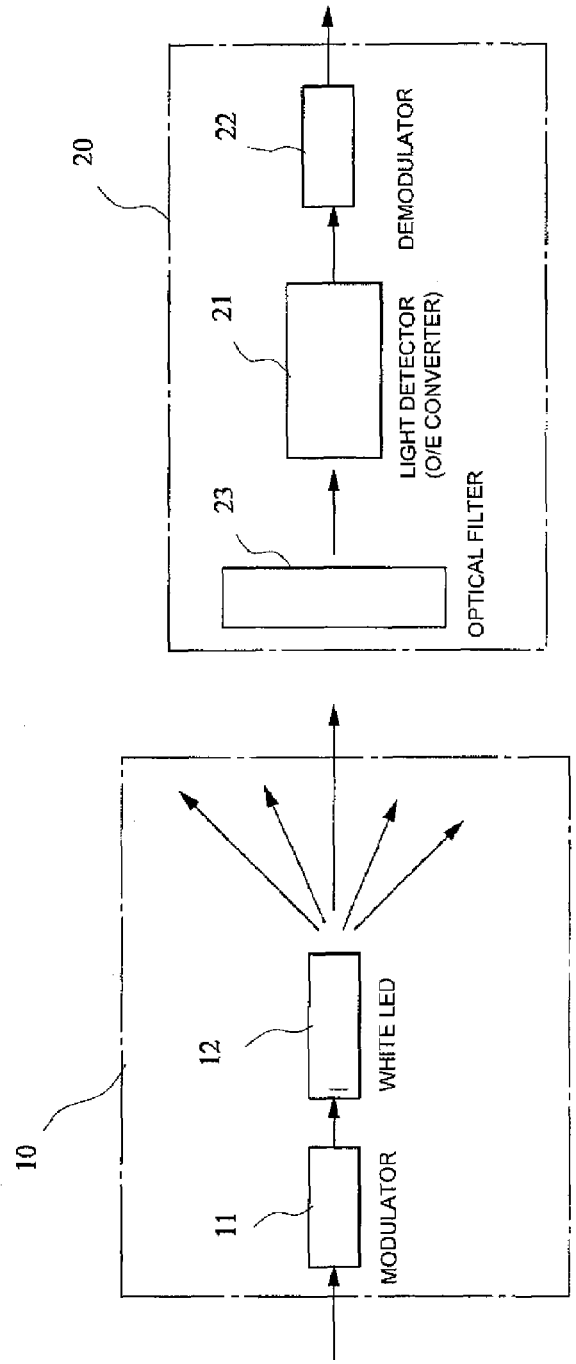
FIG. 10 illustrates the structure of another known optical communication system.

In addition, to realize a communication apparatus including a transmitter and a receiver, for example, some component may be shared, as shown by a communication apparatus 300 in FIG. 7. The communication apparatus 300 is a fourth exemplary embodiment. The same reference numerals are used in both fourth embodiment and first (second or third) embodiment to identify the same components, and therefore, descriptions thereof are not repeated. In the communication apparatus 300 shown in FIG. 7, the light detector 104 is shared by a transmitter 100C and a receiver 200C. In such a case, the output from the light detector 104 is switched by a mode switching circuit 107 on the basis of an externally input switching control signal. That is, in a transmission mode, the mode switching circuit 107 delivers the output from the light detector 104 to the high-pass filter circuit 106 of the transmitter 100C. In a reception mode, the mode switching circuit 107 delivers the output from the light detector 104 to the high-pass filter circuit 204 of the transmitter 100C. Furthermore, the high-pass filter may be shared.

Additionally, the light detectors 104 and 202 in the transmitters 100A and 100B and the receivers 200A and 200B according to the first to third embodiments may be composed of, for example, a PD and an opto-electronic integrated circuit (OEIC) that are designed to have high sensitivity for the wavelength of blue light emitted from a blue LED. The PD and OEIC have been developed for a next-generation digital versatile disc (DVD) system using a blue laser diode. By achieving an optical communication system using a light detector having a high sensitivity for blue light, this optical communication system can extend the communication distance more than that of the optical communication systems according to the first to third embodiments.

In addition, a white LED having a UV light source (a UV-excited white LED may be used, or any other light source having a plurality of output wavelengths may be used, especially if the wavelengths have different driving response characteristics.

Furthermore, while the foregoing embodiments have been described with reference to the wavelength of blue light as the wavelength of light for transmitting a signal, the wavelength of blue light is not limited to such an application. Any other wavelengths that can provide high-speed signal transmission may be used.

Still furthermore, while the foregoing embodiments have been described with reference to the high-pass filter circuit 106 or 204 having an analog filter circuit, it is to be understood that the high-pass filter circuit 106 or 204 may be composed of a digital filter or a discrete-time signal processing device.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by foregoing description. All changes which come within the meaning and range of equivalency of the claims are to be embraced within their scope.

What is claimed is:

1. An optical communication transmitter comprising:
a modulating circuit configured to generate an electrical current based at least in part on a transmission electrical signal;
an emitting device configured to receive the electrical current from the modulating circuit and emit a light signal comprising light components of a plurality of wavelengths based on the electrical current, wherein the emitting device comprises a light source and a fluorescent material configured to emit light when excited by light emitted from the light source;
a detecting circuit configured to selectively detect a light signal component having a specific wavelength from the light signal and convert the light signal component to a monitoring electrical signal; and
a waveform controlling circuit configured to generate a control signal based at least in part on the response times of the monitoring electrical signal and the transmission electrical signal, the control signal being applied to adjust the operation of the modulating circuit.

2. The optical communication transmitter according to claim 1, wherein the waveform controlling circuit decreases the response time of the light signal component by applying the control signal to adjust the operation of the modulating circuit.

3. The optical communication transmitter according to claim 1, wherein the modulating circuit further comprises a peaking circuit configured to adjust the electrical current based on the control signal and wherein the waveform controlling circuit is configured to generate the control signal so that the time delay of the waveform of the monitoring electrical signal with respect to the waveform of the transmission electrical signal is less than or equal to a predetermined value.

4. The optical communication transmitter according to claim 3, wherein the light signal component having the specific wavelength is the light signal component having the smallest time delay of the light components of the light signal.

5. The optical communication transmitter according to claim 1, wherein the light source comprises an ultraviolet light source.

6. The optical communication transmitter according to claim 1, wherein the light source comprises a light-emitting diode.

7. The optical communication transmitter according to claim 1, wherein the detecting circuit comprises:

an optical filter configured to selectively transmit the light signal component having a specific wavelength from the light signal; and a convening circuit configured to convert the light signal component to the monitoring electrical signal.

8. An optical communication transmitter comprising:

a modulating circuit configured to generate an electrical current based at least in part on a transmission electrical signal;

an emitting device configured to receive the electrical current from the modulating circuit and emit a light signal comprising light components of a plurality of wavelengths based on the electrical current;

a detecting circuit configured to selectively detect a light signal component having a specific wavelength from the light signal and convert the light signal component to a monitoring electrical signal;

a waveform controlling circuit configured to generate a control signal based at least in pan on the response times of the monitoring electrical signal and the transmission electrical signal, the control signal being applied to adjust the operation of the modulating circuit;

wherein the modulating circuit further comprises a peaking circuit configured to adjust the electrical current based on the control signal and wherein the waveform controlling circuit is configured to generate the control signal so that the time delay of the waveform of the monitoring electrical signal with respect to the waveform of the transmission electrical signal is less than or equal to a predetermined value, and wherein the light signal component having the specific wavelength is the light signal component having the smallest time delay of the light components of the light signal.

9. The optical communication transmitter according to claim 8, wherein the waveform controlling circuit decreases the response time of the light signal component by applying the control signal to adjust the operation of the modulating circuit.

10. The optical communication transmitter of claim 8, wherein the emitting device comprises a light source and a fluorescent material configured to emit light when excited by light emitted from the light source.

11. The optical communication transmitter according to claim 10, wherein the light source comprises an ultraviolet light source.

12. The optical communication transmitter according to claim 10, wherein the light source comprises a light-emitting diode.

13. The optical communication transmitter according to claim 8, wherein the detecting circuit comprises:

an optical filter configured to selectively transmit the light signal component having a specific wavelength from the light signal; and a converting circuit configured to convert the light signal component to the monitoring electrical signal.

\* \* \* \* \*

UNITED STATES PATENT AND TRADEMARK OFFICE
CERTIFICATE OF CORRECTION

PATENT NO.       : 7,650,082 B2
APPLICATION NO.  : 11/499413
DATED            : January 19, 2010
INVENTOR(S)      : Yamada et al.

It is certified that error appears in the above-identified patent and that said Letters Patent is hereby corrected as shown below:

Column 13, line 4, which reads, "a convening", should read -- a converting --

Column 13, line 19, which reads, "in pan", should read -- in part --

Signed and Sealed this

Twenty-eighth Day of September, 2010

David J. Kappos
*Director of the United States Patent and Trademark Office*